(12) United States Patent
Honkanen

(10) Patent No.: US 10,322,694 B2
(45) Date of Patent: Jun. 18, 2019

(54) BLUETOOTH VERIFICATION FOR VEHICLE ACCESS SYSTEMS

(71) Applicant: Huf North America Automotive Parts Manufacturing Corp., Milwaukee, WI (US)

(72) Inventor: Matthew R. Honkanen, Northville, MI (US)

(73) Assignee: Huf North America Automotive Parts Manufacturing Corp., Milwaukee, WI (US)

( * ) Notice: Subject to any disclaimer, the term of this patent is extended or adjusted under 35 U.S.C. 154(b) by 107 days.

(21) Appl. No.: 15/108,728

(22) PCT Filed: Dec. 30, 2014

(86) PCT No.: PCT/US2014/072671
§ 371 (c)(1),
(2) Date: Jun. 28, 2016

(87) PCT Pub. No.: WO2015/103206
PCT Pub. Date: Jul. 9, 2015

(65) Prior Publication Data
US 2016/0318475 A1    Nov. 3, 2016

Related U.S. Application Data

(60) Provisional application No. 61/922,363, filed on Dec. 31, 2013.

(51) Int. Cl.
*G08B 13/00* (2006.01)
*B60R 25/01* (2013.01)
(Continued)

(52) U.S. Cl.
CPC .......... *B60R 25/01* (2013.01); *F02N 11/0807* (2013.01); *G07C 9/00182* (2013.01);
(Continued)

(58) Field of Classification Search
None
See application file for complete search history.

(56) References Cited

U.S. PATENT DOCUMENTS

| 5,583,486 A | 12/1996 | Kersten |
| 2010/0075655 A1 | 3/2010 | Howarter |

(Continued)

FOREIGN PATENT DOCUMENTS

| CN | 1144572 A | 3/1997 |
| CN | 102270314 A | 12/2011 |

(Continued)

OTHER PUBLICATIONS

State Intellectual Property Office, Notification of First Office Action for CN Application No. 201780071645.2, dated Aug. 2, 2017.
(Continued)

*Primary Examiner* — Adam D Tissot
(74) *Attorney, Agent, or Firm* — Honigman LLP; Matthew H. Szalach; Jonathan P. O'Brien

(57) ABSTRACT

The present disclosure provides methods for using a Bluetooth device for interacting with a key fob and vehicle controller. The Bluetooth device can be used in combination with the key fob to increase the security of access to vehicle functions such as passive start, door and window locking, unlocking, closing, and opening. The Bluetooth device can also be used in conjunction with the key fob to access data from vehicle control system, and to authenticate additional key fobs.

19 Claims, 2 Drawing Sheets

(51) Int. Cl.
*G07C 9/00* (2006.01)
*F02N 11/08* (2006.01)

(52) U.S. Cl.
CPC .... *G07C 9/00309* (2013.01); *B60R 2325/101* (2013.01); *G07C 2209/63* (2013.01)

(56) References Cited

U.S. PATENT DOCUMENTS

| | | | | |
|---|---|---|---|---|
| 2011/0275321 | A1* | 11/2011 | Zhou | H04M 1/6091 455/41.2 |
| 2011/0316669 | A1* | 12/2011 | McBride | B60R 25/245 340/5.72 |
| 2013/0259232 | A1 | 10/2013 | Petel | |
| 2014/0188348 | A1* | 7/2014 | Gautama | B60W 10/30 701/48 |

FOREIGN PATENT DOCUMENTS

| | | |
|---|---|---|
| CN | 203142571 U | 8/2013 |
| CN | 103434483 A | 12/2013 |
| WO | WO-9523394 A1 | 8/1995 |
| WO | WO-2014-052059 A1 | 4/2014 |

OTHER PUBLICATIONS

International Searching Authority, International Search Report and Written Opinion for PCT Application No. PCT/US2014/072671, dated Jul. 27, 2015.
State Intellectual Property Office (PRC), Office Action for CN Application No. 201480071645.2, dated Apr. 11, 2018.
State Intellectual Property Office (PRC), CN Application No. 201480071645.2, dated Sep. 30, 2018.

* cited by examiner

BLUETOOTH VERIFICATION FOR VEHICLE ACCESS SYSTEMS

CROSS-REFERENCE TO RELATED APPLICATIONS

This application is the national phase of International Application No. PCT/US2014/072671, filed Dec. 30, 2014, which claims the benefit of U.S. Provisional Patent Application No. 61/922,363 filed Dec. 31, 2013, the discloses of which are hereby incorporated by reference in their entirety.

BACKGROUND OF THE INVENTION

In recent years, wireless communications have become increasingly important in a number of vehicle control systems. Remote vehicle entry transmitters/receivers, for example, are used for locking and unlocking a vehicle door, unlatching a trunk latch, or activating or deactivating an alarm system equipped on the vehicle. This remote entry device is commonly referred to a remote keyless entry (RKE) fob. The RKE fob is typically a small rectangular or oval plastic housing with a plurality of depressible buttons for activating each one of the wireless operations. The RKE fob is carried with the operator of a vehicle and can wirelessly perform these functions when within a predetermined reception range of the vehicle. The RKE fob communicates with an electronic control module within the vehicle via a RF communication signal.

Even more recently, complex embedded electronic systems have become common to provide access and start functions, and to provide wide ranging functions to improve driver safety and convenience. These systems include Passive Entry and Passive Start (PEPS) systems. In PEPS systems, a remote receiver and transmitter (or transceiver) is carried with the user in a portable communication device such as a key fob or a card. The portable communication device when successfully challenged transmits a radio frequency (RF) signal to a module within the vehicle for performing a variety of remote vehicle function such door lock/unlock, enabling engine start, or activating external/internal lighting. Passive entry systems include a transmitter and receiver (or transceiver) in an electronic control module disposed within the vehicle. The transceiver is typically in communication with one or more devices (e.g., door lock mechanism) for determining when a request for actuation of a device is initiated (e.g., lifting a door handle) by a user.

Upon sensing the request for actuation, the transceiver broadcasts a passive entry interrogating signal. The fob upon receiving the interrogating signal from the ECU, the portable communication device determines if the interrogating signal is valid. If it is determined a valid signal, then the fob automatically broadcasts an output signal which includes an encrypted or rolling identification code to the electronic control module. The electronic module thereafter determines the validity of the output signal and generates a signal to the device to perform an operation (e.g., the door lock mechanism to unlock the door) if the output signal is determined valid.

Increasingly, wireless personal computing devices are also used in vehicles. Computing devices such as smart phones, for example, currently incorporate interfaces that support wireless communication standards such as the Bluetooth protocol. The Bluetooth protocol, in general, enables point-to-point wireless communications between multiple devices over short distances (e.g., 30 meters). Bluetooth has gained widespread popularity since its introduction and is currently used in a range of different devices. For example, may "hands free" communications systems in vehicles communicate to a cellular telephone using Bluetooth.

While wireless communication systems provide a great advantage to authorized users of vehicles, these devices also cause security problems. Wireless devices mimicking an authorized wireless fob or other device can be used by thieves to gain access to vehicles, and to start vehicles. The present disclosure addresses these and other issues.

SUMMARY OF THE INVENTION

The present disclosure provides a wireless communications system for an automotive vehicle comprising a control unit in the automotive vehicle including a first transceiver configured to receive signals from a fob, and a second transceiver configured to communicate with a Bluetooth-enabled device, a memory for a memory correlating paired key fobs with Bluetooth devices; and a key fob comprising a transceiver and a control unit in communication with the control unit in the automotive vehicle. The control unit in the automotive vehicle is programmed to determine a location of the key fob; determine a location of the paired Bluetooth device; and selectively provide access to vehicle control and vehicle control data when the paired key fob and Bluetooth device are within a predetermined proximity of one another. In another aspect, the predetermined proximity can, for example, require the key fob and the Bluetooth device to be in the automotive vehicle. The wireless communication system can also, for example, selectively provide access to start the vehicle using a passive start when the Bluetooth device and key fob are both located in the vehicle. The wireless communications system can also be programmed to allow pairing of additional key fobs to the Bluetooth device and automotive vehicle.

In another aspect of the disclosure, the memory is accessible from a computer and the data correlating paired key fobs with Bluetooth devices is stored before use. The vehicle controller and the memory can also be in communication with a display and a corresponding user input device positioned in the vehicle, and pairing data can be selectively provided to the vehicle controller and corresponding memory through the user interface, and viewed on the display.

In yet another aspect of the disclosure, the vehicle controller can be programmed to selectively provide access to at least one vehicle function when the Bluetooth device and fob are within a predetermined distance of the vehicle. The vehicle function can comprise at least one of unlocking one or more of the doors of the vehicle, activating at least one of external and internal vehicle lighting, activating a vehicle camera; at least one of opening and closing a windows. The vehicle function can also include activating at least one internal electric devices, such as a radio and a telephone, or adjusting a driver preference.

In another aspect, the disclosure provides a method for pairing a Bluetooth device and a vehicle fob. The Bluetooth device is positioned within a predetermined distance of a vehicle controller, and is placed into a discoverable mode enabling the vehicle controller to communicate with the Bluetooth device via a Bluetooth transceiver. The Bluetooth device is correlated with the vehicle fob. The step of correlating the Bluetooth device with the fob can comprises providing identifying data to the controller through a display. Alternatively, the step of correlating the Bluetooth device with the fob can comprise transmitting a signal from the fob to the vehicle controller. The step of correlating the Bluetooth device with the fob can also comprise identifying the Bluetooth device and the fob with the vehicle controller.

In still another aspect of the invention, a method for providing access to systems in a vehicle controlled by vehicle control system is provided. In this method, a Bluetooth device is paired with a vehicle fob in the vehicle control system. The Bluetooth device is positioned within a predetermined distance of the vehicle fob to authenticate the Bluetooth device, wherien the Bluetooth device can access the vehicle controller from the Bluetooth device via a Bluetooth transceiver. The vehicle controller can be programmed to selectively transmit vehicle status information to the Bluetooth device. The Bluetooth device can be used to download applications to the vehicle controller through the Bluetooth transceiver. Additionally, an application for authorizing another key fob can be on the Bluetooth device, and used to enable the Bluetooth device to authorize an additional key fob to access vehicle control functions.

These and other aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DETAILED DESCRIPTION OF THE INVENTION

Figure 1:
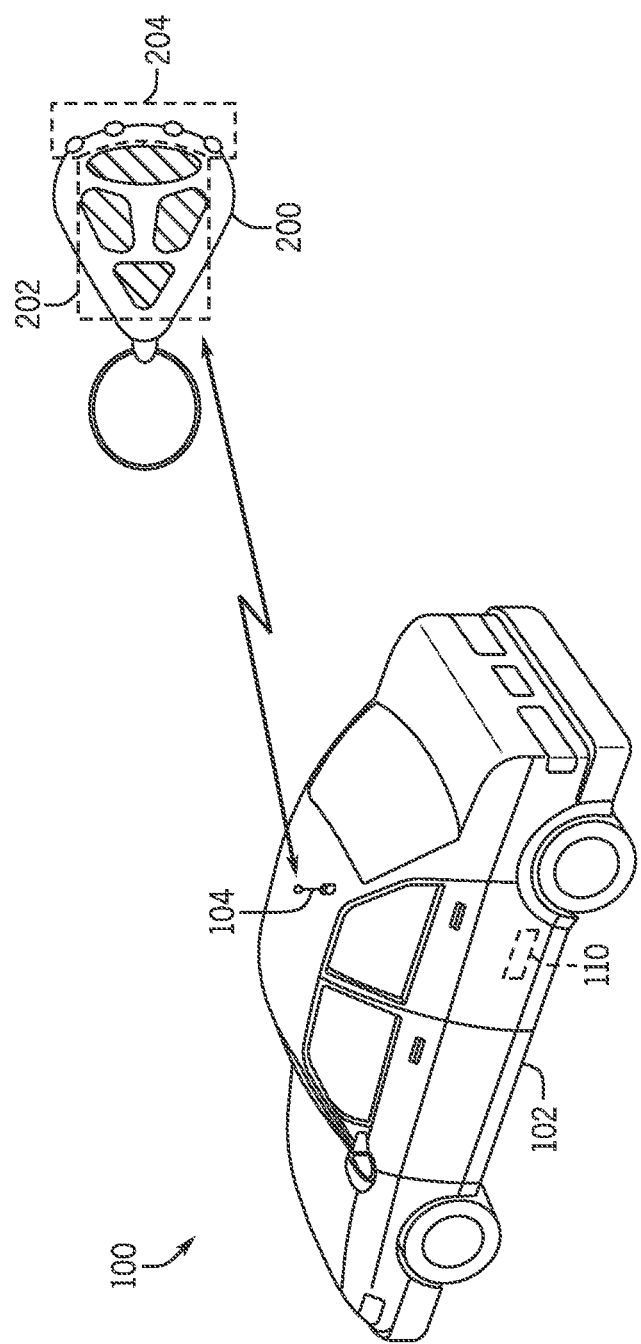
FIG. 1 illustrates a wireless vehicle communication system including a vehicle, vehicle transceiver module, and an antenna communicating with a mobile electronic user device.

Referring to FIG. 1, a wireless vehicle communication system 100 is shown. The system 100 comprises a vehicle 102 including a vehicle transceiver module 110 having an antenna 104 communicating with a mobile electronic user device 200, which here is shown and described as a key fob. It will be apparent that the mobile electronic user device 200 can be many types of application-specific or personal computerized devices, including, for examples, transponder cards, personal digital assistants, tablets, cellular phones, and smart phones. Communications are typically described below as bi-directional between the vehicle transceiver module and the key fob 200 and other devices, although it will be apparent that in many applications one way communications will be sufficient.

The key fob 200 can include one or more user input device 202 and one or more user output or alert devices 204. The user input devices 202 are typically switches such as buttons that are depressed by the user. The user output alert devices 204 can be one or more visual alert, such as light emitting diodes (LEDs), a liquid crystal display (LCD), and audible alarm, or a tactile or vibratory device. A single function can be assigned to each input device 202 or user alert devices 204, or a combination of input devices or a display menu could be used to request a plethora of functions via input device sequences or combinations. Key fobs can, for example, provide commands to start the vehicle, provide passive entry (i.e., automatic unlocking of the doors of the vehicle 102 when key fob 200 is within a predetermined proximate distance of the vehicle 102), activate external and internal vehicle lighting, preparation of the vehicle locking system, activation of a vehicle camera for vehicle action in response to camera-detected events, opening windows, activating internal electric devices, such as radios, telephones, and other devices, and adjustment of driver preferences (e.g., the position of the driver's seat and the tilt of the steering wheel) in response to recognition of the key fob 200. These functions can be activated input devices 202 or automatically by the vehicle 102 detecting the key fob 200. Although a single key fob is shown here, it will be apparent that any number of key fobs could be in communication with the vehicle transceiver module, and the vehicle transceiver module 110 and corresponding control system could associate a different set of parameters with each key fob.

In addition, the vehicle transceiver module 110 can activate output or alert devices 204 to notify the vehicle user that the key fob 200 is within communication distance or some other predetermined distance of the vehicle 102; notify the vehicle user that a vehicle event has occurred (e.g., activation of the vehicle security system), confirm that an instruction has been received from the key fobs 200, or that an action initiated by key fob 200 has been completed.

Figure 2:
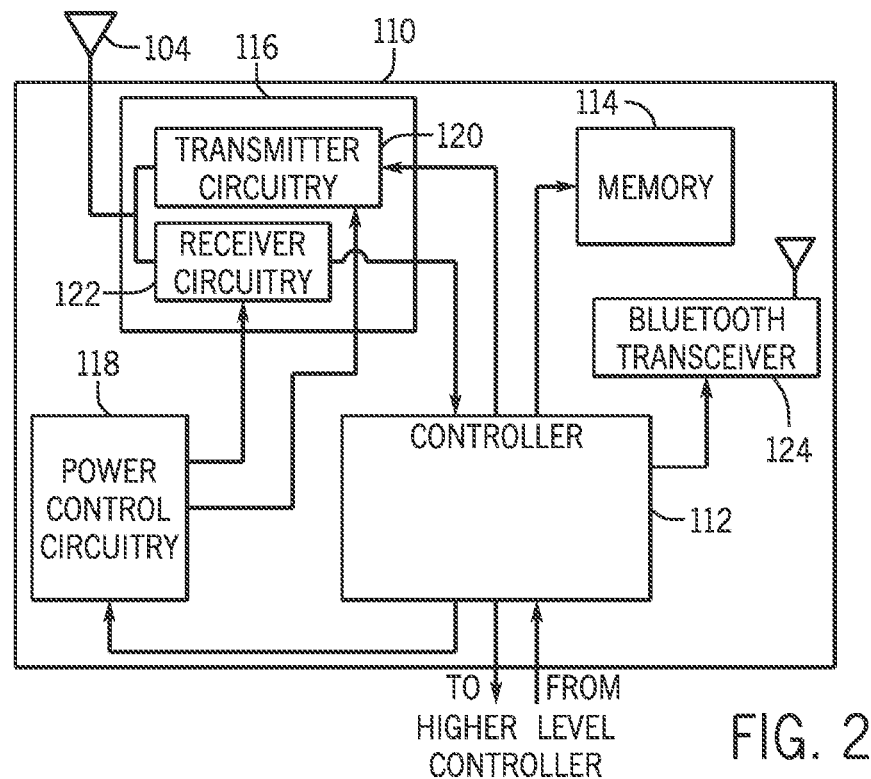
FIG. 2 is a block diagram of an exemplary vehicle transceiver module that can be used in accordance with the disclosed system.

Referring now to FIG. 2, a block diagram of an exemplary vehicle transceiver module 110 that can be used in accordance with the disclosed system is illustrated. The vehicle transceiver module 110 includes a processor or controller 112, memory 114, a power supply 118, and transceiver circuitry 116 communicating through the antenna 104, and a Bluetooth transceiver 124 for one way or bi-directional communications with an external Bluetooth enabled device, such as a cellular telephone, smart phone, or a computing device such as a laptop, tablet, PDA, or similar device. The memory 114 in transceiver module 110 can store, for example, data identifying key fobs 200 that are authorized to access the vehicle 102, and can also store corresponding identifying data for Bluetooth devices that are paired with the corresponding key fobs 200 to provide a security function, as described below.

The transceiver circuitry 116 includes receiver circuitry 122 and transmitter circuitry 120 for bi-directional communications. The receiver circuitry 122 demodulates and decodes received RF signals from the key fob 200, while the transmitter provides RF codes to the key fob 200, as described below. Although a bi-directional transceiver 110 is shown, it will be apparent that one way communications from the key fob 200 to the vehicle 102, or from the vehicle to the key fob 200 can also be provided, and that both a transmitter and receiver would not be required.

The memory 114 stores data and operational information for use by the processor 112 to perform the functions of the vehicle transceiver module 110, and to provide the vehicle function(s) described above. The controller 112 is also coupled to a higher level vehicle controller or controllers (not shown), which can include, for example, a vehicle bus such as a Controller Area Network (CAN) bus system and corresponding vehicle control system, and can both receive command signals from the vehicle control system and provide command signals and other information to the vehicle control system. Information available to other devices from the CAN bus or other online vehicle bus may include, for example, vehicle status information regarding vehicle systems, such as ignition status, odometer status (distance traveled reading), wheel rotation data (e.g., extent of wheel rotation), etc. Vehicle status data can also include status of electronic control systems including among others, Supplemental Restraint Systems (SRS), Antilock Braking Systems (ABS), Traction Control Systems (TCS), Global Positioning Systems (GPS), Environmental monitoring and control Systems, Engine Control Systems, cellular, Personal Communications System (PCS), and satellite based communication systems and many others not specifically mentioned here.

The transceiver 110 is coupled to the antenna 104 for receiving radio frequency (RF) signals from the key fob 200 and transmitting signals to the key fob 200. Although the antenna 104 is shown as being external to the vehicle transceiver module 110 and on the exterior of the vehicle 102, the antenna 104 may also be implemented within the confines of the vehicle 120 or even within the vehicle transceiver module. A number of antennas can be embedded, for example, in the headliner of a vehicle, or elsewhere within a vehicle. Although a bi-directional transceiver 110 is shown, it will be apparent that one way communications from the key fob 200 to the vehicle 102, or from the vehicle to the key fob 200 can also be provided, and that both a transmitter and receiver would not be required.

Figure 3:
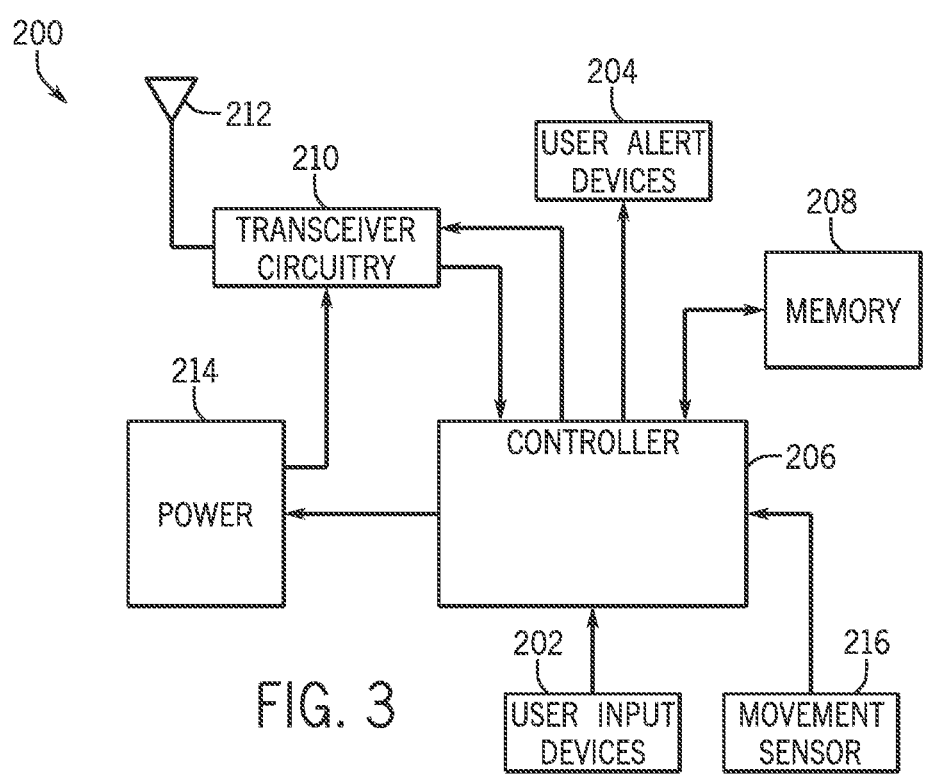
FIG. 3 is a block diagram of an exemplary key fob that can be used in accordance with the disclosed system.

Referring now to FIG. 3, a block diagram of an exemplary key fob 200 that can be used in accordance with the disclosed system includes a controller 206, memory 208, transceiver 210 and corresponding antenna 212, and a power supply 214 (such as a battery). User input devices 202 and user alert devices 204 are in communication with the controller 206. The transceiver circuitry 210 includes receiver circuitry and transmitter circuitry, the receiver circuitry demodulating and decoding received RF signals to derive information and to provide the information to the controller or processor 206 to provide functions requested from the key fob 200. The transmitter circuitry encodes and modulating information from the processor 206 into RF signals for transmission via the antenna 212 to the vehicle transceiver 110.

Although many different types of communications systems could be used, conventional vehicles typically utilize four short-range RF based peer-to-peer wireless systems, including Remote Keyless Entry (RKE), Passive Keyless Entry (PKE), Immobilizer and Tire Pressure Monitoring System (TPMS). RKE and TPMS typically use the same high frequency with different signal modulation (315 MHz for US/NA, 433.32 MHz for Japan and 868 MHz for Europe), whereas the PKE system often requires a bidirectional communication at a low frequency (125 KHz) between the key fob and the receiver module and a unidirectional high frequency communication from key fob to the receiver module. The Immobilizer system also typically uses a low frequency bidirectional communication between the key fob and the receiver module. Receivers for these systems are often standalone and/or reside in various control modules like Body Control Module (BCM) or Smart Junction Block (SJB). By using different radios with different carrier frequencies and/or modulation schemes, collisions between transmissions from separate wireless communication systems in the vehicles can be avoided.

The antenna 212 located within the fob 200 may be configured to transmit long-range ultra-high frequency (UHF) signals to the antenna 104 of the vehicle 100 and receive short-range Low Frequency (LF) signals from the antenna 104. However, separate antennas may also be included within the fob 200 to transmit the UHF signal and receive the LF signal. In addition, antenna 104 and other antennas in the vehicle may be configured to transmit LF signals to the fob 200 and receive UHF signals from the antenna 212 of the fob 200. Also, separate antennas may be included within the vehicle 102 to transmit LF signals to the fob 200 and receive the UHF signal from the fob 200

The fob 200 may also be configured so that the fob controller 206 may be capable of switching between one or more UHF channels. As such, the fob controller 206 may be capable of transmitting a response signal across multiple UHF channels. By transmitting the response signal across multiple UHF channels, the fob controller 206 may ensure accurate communication between the fob 200 and the vehicle transceiver 110.

Referring still to FIG. 3, a motion detection device, such as a movement sensor 216, can optionally be included in the key fob 200 to detect movement of the key fob 200. The controller 206 can, for example, utilize the motion or lack of motion detected signal from the movement sensor 216 to place the key fob 200 in a sleep mode when no motion is detected for a predetermined time period. The predetermined time period during which no motion is detected that could trigger the sleep mode could be a predetermined period of time or a software configurable value. Although the motion detection device is here shown as part of the key fob, a motion detection device could additionally or alternatively be provided in the vehicle 102.

The vehicle transceiver 110 may transmit one or more signals without an operator activating a switch or pushbutton on the fob key 200, including a wakeup signal intended to activate a corresponding fob 200. The fob 200 may receive signals from the transceiver 110 and determine the strength or intensity of the signals (Received Signal Strength Indication (RSSI)), which can be used to determine a location of the fob 200, both within and outside of the vehicle 102.

Referring again to FIG. 2, in operation, the Bluetooth transceiver 124 can be used in conjunction with a Bluetooth device paired to the key fob 200 to provide an additional level of security for starting or accessing the vehicle 102, or to provide selective access to status information about the vehicle. One or more key fob 200 is typically paired to a vehicle as part of the manufacturing process, or by the vehicle dealer. As a result, identifying data for the key fobs 200 authorized to control the vehicle 102 is stored in the memory 114 of vehicle transceiver 110. A user Bluetooth device, such as a smart phone or other electronic device, can also be paired to the vehicle 102.

Methods for pairing a Bluetooth device can vary depending on the type of device. Initially, however, the Bluetooth device needs to be positioned within or very near the vehicle 102 The Bluetooth device must then be put into a discoverable mode, which allows the controller 112 of vehicle 102 to communicate with the Bluetooth device via Bluetooth transceiver 124. Data identifying the Bluetooth device can be provided on a display screen inside the vehicle 102, and a vehicle user can, for example, correlate the Bluetooth device with a specific key fob 200 by way of a display and/or one or more user input device (e.g. buttons or switches provided in the vehicle as, for example, on the steering wheel) in communication with the vehicle controller 112, or by activating the key fob 200 to provide identifying data to the controller 112 after the Bluetooth device is activated and identified by the controller 112. Alternatively, Bluetooth devices could be paired with key fobs 200 at a computing device by the vehicle dealer, at a service center, or other locations, and the pairing data can be downloaded to the memory 114.

In operation, the vehicle controller 112 can restrict access to functions until both the paired Bluetooth device and the key fob 200 are identified to be within the vehicle 102 that corresponds to the Bluetooth device is also present. For example, to provide additional security, the vehicle controller 112 can require identification of both a key fob 200 and the paired Bluetooth device before allowing a passive start function to activate the vehicle 102.

In other applications, the vehicle controller 112 can allow access to higher security functions through the Bluetooth device when the key fob 200 and Bluetooth device are found to be in proximity to one another and are identified. Here, for example, the Bluetooth device can be used to access more complex vehicle controls. For example, when the key fob 200 and a paired Bluetooth device are in proximity, the Bluetooth device can request transmission of vehicle status information from the controller 112. The Bluetooth device could also be used to download applications into the vehicle controller 112 and corresponding memory 114.

In other applications, the paired key fob 200 and Bluetooth device can be used to authorize additional key fobs 200. Here, for example, when the Bluetooth device and paired key fob 200 are determined to be in proximity, an application for authorizing another key fob 200 can be provided on the Bluetooth device. The Bluetooth device can download data identifying the additional key fob 200 to the memory 114 in controller 110.

Although specific embodiments are described above, it will be apparent to those of ordinary skill that a number of variations can be made within the scope of the disclosure For example, although bidirectional communications between the vehicle and remote control, passive entry, and sensor devices is shown and described, one-way communications can also be used. Although a key fob is described above, it will be apparent that various types of personal communication devices including smart phones, laptops, tablets, computers, and other devices can be used as a key fob controller or in addition to a key fob. It should be understood, therefore, that the methods and apparatuses described above are only exemplary and do not limit the scope of the invention, and that various modifications could be made by those skilled in the art that would fall within the scope of the invention. To apprise the public of the scope of this invention, the following claims are made:

What is claimed is:

1. A wireless communications system for an automotive vehicle comprising:
   a control unit in the automotive vehicle including a first transceiver and a second transceiver;
   a memory disposed within the vehicle and in communication with the control unit;
   a key fob paired with the automotive vehicle and comprising a transceiver and a control unit in communication with the control unit in the automotive vehicle; and
   a user input device in communication with the control unit,
   wherein the control unit in the automotive vehicle is programmed to:
      determine a location of the paired key fob; and
      determine a location of a Bluetooth device paired with the automotive vehicle,
   wherein the first transceiver is configured to receive signals from the paired key fob, and the second transceiver is configured to communicate with the paired Bluetooth device,
   wherein the memory is configured to correlate the paired key fob with the paired Bluetooth device based on an input received at the user input device,
   wherein the control unit in the automotive vehicle is further programmed to selectively provide access to vehicle control and vehicle control data based on whether (i) the paired key fob and the paired Bluetooth device are within a predetermined proximity of one another and (ii) the paired key fob is correlated with the paired Bluetooth device, and
   wherein the Bluetooth device is configured to download applications to the control unit in the automotive vehicle through the second transceiver.

2. The wireless communications system of claim 1, wherein the predetermined proximity requires the key fob and the Bluetooth device to be in the automotive vehicle.

3. The wireless communications system of claim 1, wherein the control unit in the automotive vehicle is further programmed to selectively provide access to start the vehicle using a passive start when the Bluetooth device and the key fob are both located in the vehicle.

4. The wireless communications system of claim 1, wherein the memory is accessible from a computer and the data correlating paired key fobs with Bluetooth devices is stored before use.

5. The wireless communications system of claim 1, wherein the control unit in the automotive vehicle and the memory are in communication with a display and a corresponding user input positioned in the vehicle, and pairing data can be selectively provided to the control unit in the automotive vehicle and corresponding memory through the user input and viewed on the display.

6. The wireless communications system of claim 1, wherein the control unit in the automotive vehicle is programmed to selectively provide access to at least one vehicle function when the Bluetooth device and the key fob are within a predetermined distance of the vehicle.

7. The wireless communications system of claim 6, wherein the vehicle function comprises at least one of unlocking one or more doors of the vehicle; activating at least one of external and internal vehicle lighting; activating a vehicle camera; or at least one of opening and closing a window.

8. The wireless communications system of claim 6, wherein the vehicle function comprises activating at least one internal electric device.

9. The wireless communications system of claim 8, wherein the at least one internal electric device comprises at least one of a radio and a telephone.

10. The wireless communications system of claim 6, wherein the vehicle function comprises adjusting a driver preference.

11. A method for pairing a Bluetooth device and a vehicle fob comprising the following steps:
    positioning the Bluetooth device within a predetermined distance of a vehicle controller;
    placing the Bluetooth device in a discoverable mode enabling the vehicle controller to communicate with the Bluetooth device via a Bluetooth transceiver;
    receiving an input at a user input device disposed within the vehicle;
    transmitting the input to the vehicle controller;
    correlating the Bluetooth device with the vehicle fob based on the input;
    selectively providing access to vehicle control data based on whether (i) the vehicle fob and the Bluetooth device are within a predetermined proximity of one another and (ii) the vehicle fob is correlated with the Bluetooth device; and downloading an application to the vehicle controller through the Bluetooth transceiver.

12. The method of claim 11, wherein the step of correlating the Bluetooth device with the vehicle fob comprises providing identifying data to the vehicle controller through a display.

13. The method of claim 11, wherein the step of correlating the Bluetooth device with the vehicle fob comprises transmitting a signal from the vehicle fob to the vehicle controller.

14. The method of claim 11, wherein the step of correlating the Bluetooth device with the vehicle fob comprises the step of identifying the Bluetooth device and the vehicle fob with the vehicle controller.

15. A method for providing access to systems in a vehicle controlled by a vehicle control system, the method comprising the following steps:

receiving an input at a user input device disposed within the vehicle;

transmitting the input to the vehicle control system;

pairing a Bluetooth device and a vehicle fob to the vehicle control system based on the input;

positioning the Bluetooth device within a predetermined distance of the vehicle fob to authenticate the Bluetooth device with the vehicle fob;

accessing the vehicle control system from the Bluetooth device via a Bluetooth transceiver based on whether (i) the vehicle fob and the Bluetooth device are within the predetermined distance of one another and (ii) the vehicle fob is authenticated with the Bluetooth device; and downloading applications to the vehicle control system through the Bluetooth transceiver.

16. The method as recited in claim 15, wherein the vehicle control system is operable to selectively transmit vehicle status information to the Bluetooth device.

17. The method as recited in claim 15, further comprising the step of providing an application for authorizing another key fob on the Bluetooth device, and enabling the Bluetooth device to authorize an additional key fob to access vehicle control functions.

18. The wireless communications system of claim 1, wherein Bluetooth device includes an application configured to enable the Bluetooth device to authorize an additional key fob to access vehicle control and vehicle control data.

19. The method of claim 11, further comprising (i) downloading to the Bluetooth device an application operable to authorize an additional vehicle fob, and (ii) enabling the Bluetooth device to authorize the additional vehicle fob to access vehicle control functions.

* * * * *